United States Patent
Martin et al.

[11] Patent Number: 5,269,551
[45] Date of Patent: Dec. 14, 1993

[54] CYCLE FRAME

[76] Inventors: Pierre A. Martin, Quartier les Roches, Loriol, France, 26270; Christian Pascaud, 8, rue Jules Ferry, Le Pouzin, France, 07250; Jean-Marie Riffard, 7, Les Charmilles, Livron, France, 26250

[21] Appl. No.: 832,323

[22] Filed: Feb. 7, 1992

[30] Foreign Application Priority Data

Feb. 7, 1991 [FR] France ................ 91 01632

[51] Int. Cl.⁵ ............................................. B62K 19/18
[52] U.S. Cl. .............................. 280/281.1; 280/288.3; 264/258
[58] Field of Search .............. 280/281.1, 288.2, 288.3; 264/258, 257

[56] References Cited

U.S. PATENT DOCUMENTS

| | | | |
|---|---|---|---|
| 4,086,115 | 4/1978 | Sweet, Jr. et al. | 264/258 X |
| 4,838,569 | 6/1989 | Ford | 280/283.3 X |
| 5,080,385 | 1/1992 | Duplessis | 280/288.3 X |

FOREIGN PATENT DOCUMENTS

| | | |
|---|---|---|
| 0095024 | 11/1983 | European Pat. Off. . |
| 0399075 | 11/1990 | European Pat. Off. . |
| 8913300.5 | 2/1990 | Fed. Rep. of Germany . |
| 9932 | 3/1895 | Switzerland ............ 280/281.1 |

Primary Examiner—Margaret A. Focarino
Assistant Examiner—Peter C. English
Attorney, Agent, or Firm—Bacon & Thomas

[57] ABSTRACT

A cycle frame includes an upper tube joined at one end to a lower tube by a frontal part and joined at an opposing end to stays by a continuously formed connecting part. A front fork pivot housing is attached to a reduced thickness, core portion of the frontal part and a seat post housing, having a forked base, is secured to the connecting part. The core portion and the front fork pivot housing have complementary mating surfaces to enhance the structural integrity of the assembly. In a similar fashion, the connecting part includes a cut-out portion for receiving the forked base. The frame arrangement finds particular application in racing cycles and can be readily adapted for use with riders of varying sizes by utilizing front fork pivot and seat post housings of differing configurations.

12 Claims, 6 Drawing Sheets fig_1 fig_2 fig_4 fig-6 fig_7

CYCLE FRAME

FIELD OF THE INVENTION

The present invention relates to the domain of cycles in general and is more particularly applicable to the frames of velocipedes and the like, whether it is a question of bicycles for touring, sport or racing.

BACKGROUND OF THE INVENTION

Cycle frames have formed the subject matter of numerous constructive propositions, from constituent elements of metal, plastics material, composite material, moulded in one piece or assembled by welding, adhesion or other modes of fit.

Whatever the embodiments, a cycle frame may be considered as always comprising an upper, generally substantially horizontal tube, a lower tube inclined downwardly from the upper tube, a rear fork extending from the lower end of the inclined tube and rear stays joining the ends of the fork to the upper tube.

As a general rule, a strut, called a "seat tube" is interposed between the lower tube and, substantially, the point of junction between the upper tube and the stays.

Such a triangulated structure presents a good resistance and makes it possible to fit, at the connection points, a steering pivot for the assembly of a front fork, a seat tube, a crankset casing and bearings for receiving the axle of a rear wheel.

In order to ensure maximum comfort, optimum output and good efficiency of the physical energy developed, it has been -observed for a long time that certain dimensional characteristics of the frame thus formed should correspond to the user's morphology.

For each individual, the size of the frame, the distance between the steering pivot and the seat tube, the setback of the seat tube with respect to the vertical passing through the crankset casing, must thus be taken into account. For technical reasons, it is also necessary to consider the clearance angle given to the steering pivot charged with retaining and allowing pivoting of the front fork.

In order to take into account all this data, two methods are employed for the construction of the frames.

The first is the so-called unit method which takes into account the user's morphological characteristics to determine the dimensional characteristics of the frame. It is certain that this method of construction is the most rational, but that it may be envisaged only in particular cases, as the manufacturing costs are prohibitive.

The second method consists in determining several ranges of manufacture, in each of which the dimensional characteristics are chosen, approximately, in order to constitute a compromise which is the least penalizing.

This method, which is less satisfactory, gives better results economically, as it allows the frames to be produced on a greater industrial scale, whatever the constituent materials employed.

However, in practice, this method has proved to lead most frequently to providing a user with a frame which gives greater dissatisfaction than economical advantages, due to the impossibility of suitably adjusting the different dimensional characteristics as a function of the user's real morphology.

It is an object of the present invention to overcome the drawbacks set forth hereinabove by proposing a novel cycle frame which may be made of any appropriate material, on an industrial scale, at an advantageous cost price and with a small number of predetermined ranges, from which the specific adjustments, as recalled hereinabove, may be made rapidly, simply, efficiently and inexpensively, producing a frame whose dimensional characteristics may easily be adapted to the user's requirements.

The invention aims more specifically, but not exclusively, at cycle frames made by moulding composite materials.

Another object of the invention is to propose a novel frame which, whilst responding to the objectives set forth therein above, in addition presents very good characteristics of mechanical strength, even resistance to torsion in its plane, so as to enable maximum output of the physical energy developed during pedalling to be obtained.

SUMMARY OF THE INVENTION

In order to attain the above objectives, the cycle frame according to the invention is characterized in that:

the upper tube is joined, on the one hand, to the lower tube by a frontal part and, on the other hand, to the stays by a continuous sectioned connection part, the front fork pivot housing is formed by a so-called steering box fitted by a nest fit on the frontal part, and the seat post housing is defined by a so-called seat tube fitted, by a fork fit, on the continuous sectioned connection part.

BRIEF DESCRIPTION OF THE DRAWINGS

The invention will be more readily understood on reading the following description with reference to the accompanying drawings, in which.

DETAILED DESCRIPTION OF THE DRAWINGS

Figure 1:
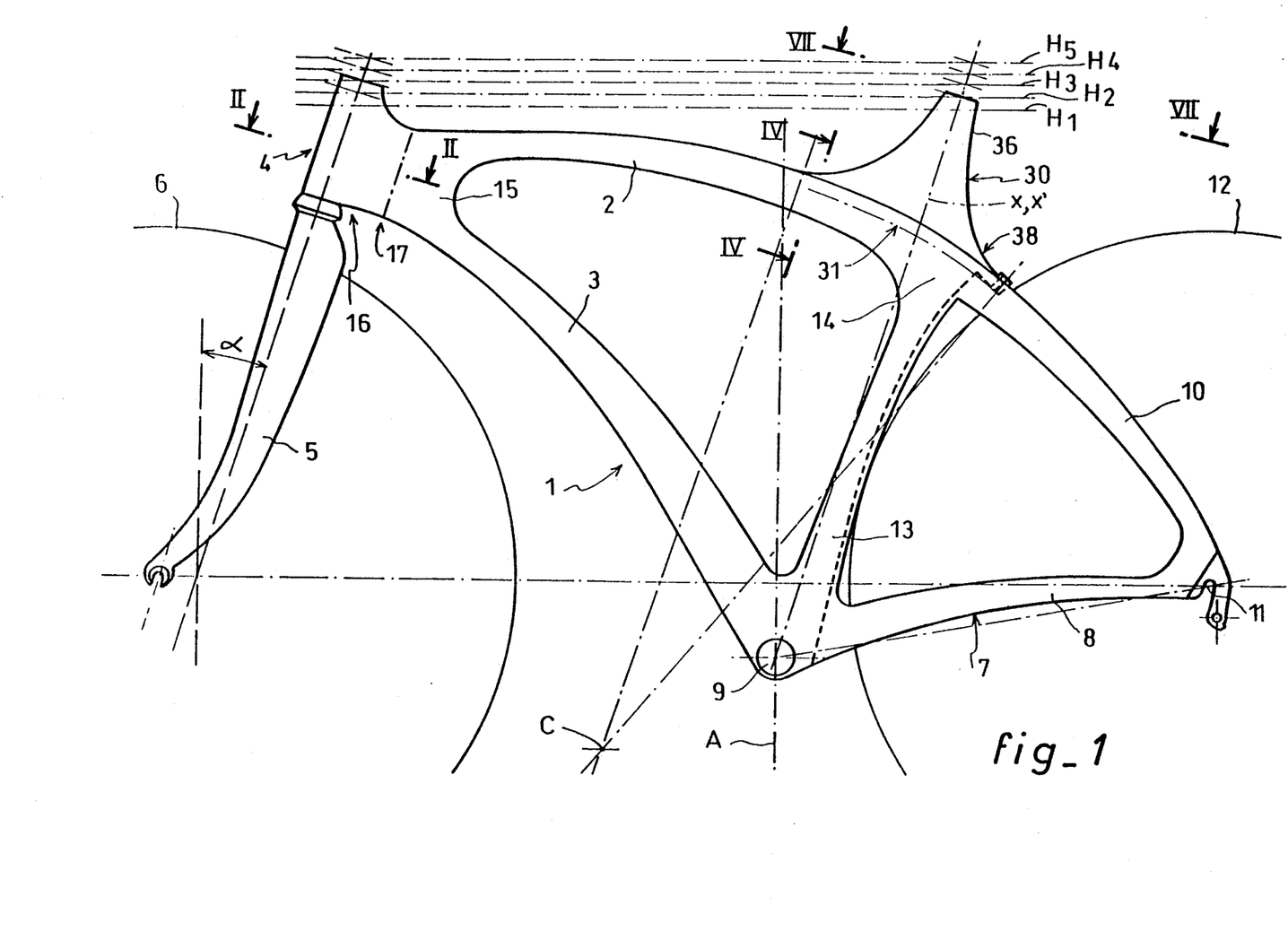
FIG. 1 is a schematic side view of the cycle frame according to the invention.

Referring now to the drawings, FIG. 1 shows the frame of the invention, generally designated by reference 1 and which may be made in one piece or of several elements assembled together according to adhesion, brazing or riveting techniques. The invention preferably concerns a frame 1 of the type moulded in one piece and made of composite materials.

Composite materials should preferably be understood to mean employing a structural core of cellular material, such a core being closely surrounded and intimately bonded to a peripheral envelope based on glass and/or carbon fiber fabrics impregnated and polymerized by an appropriate heat-setting resin.

Numerous techniques for producing frames thus designed are available in the known art and, consequently, the object of the invention will not be described in greater detail with respect to such elements which must be considered as being within the scope of the man skilled in the art.

The frame 1 is preferably formed, as illustrated in FIG. 1, so as to comprise a so-called upper tube 2, of curved shape in the plane of the frame and whose convexity faces upwardly. Frame 1 comprises a second so-called lower tube 3, inclined downwardly and connected to the front part of the upper tube 2, at which level the frame defines a housing 4 for the pivoting of a fork 5 for fixing and steering a front wheel 6.

The lower tube 3 is connected, at its lower end, to a rear fork 7 which is constituted by two divergent arms 8 each taking a curved shape whose convexity faces upwardly. The connection between the inclined lower tube 3 and the fork 7 advantageously ensures support and hold of a crankset casing 9.

Furthermore, frame 1 comprises a pair of stays 10 whose function is to connect the rear terminal parts of the arms 8 to the rear end of the upper tube 2. Stays 10 are constituted by elements taking, in the plane of the frame, a curved shape whose convexity faces upwardly. The connection between the terminal parts of the fork elements 8 and stays 10 advantageously bears or defines open bearings 11 reserved for the assembly of the axle of a rear wheel 12.

According to a feature of the invention, the upper tube 2 and the stays 10 are formed in line with one another, defining, in the plane of the frame, a continuous, curved frame element which may be braced via a transverse tube 13 interposed as strut between the crankset casing 9 and a continuous sectioned connecting part 14 joining the rear terminal part of the upper tube 2 to the stays 10.

According to another constructive arrangement of the invention, the upper frame 2 and the lower frame 3 are joined, by their front ends, by a frontal part 15 whose function is to bear a steering box 16 which is fitted, by a nest fit 17, on the frontal part 15. The nest fit 17, illustrated in greater detail in FIGS. 2 and 3, employs the following technical means.

The frontal part 15 comprises, on its front tranvserse face, a half-core 18 for embedding, preferably extending over the whole height of the frontal part 15, in a direction which may be parallel to or slightly different from the axial direction of the fork pivot 5. The core 18 may, in transverse cross section, take a substantially semi-cylindrical shape or, preferably, as illustrated in FIG. 2, a parallelepipedic base shape 18a extended by a top part 18b of trapezoidal section.

The half-core 18 is bordered, at its base, by a peripheral, so-called stop shoulder 19 which may project with respect to the lateral walls of the frontal part 15 or, preferably, may correspond to a peripheral recess for delimiting the half-core 18.

The nest fit 17 employs, on the steering box 16, a hollow, so-called assembly base 20 whose open section is defined by a peripheral edge 21. The base 20 is combined with the half-core 18 which it is adapted to receive totally by embedding and relative fit until the edge 21 is brought into abutment against shoulder 19.

Figure 2:
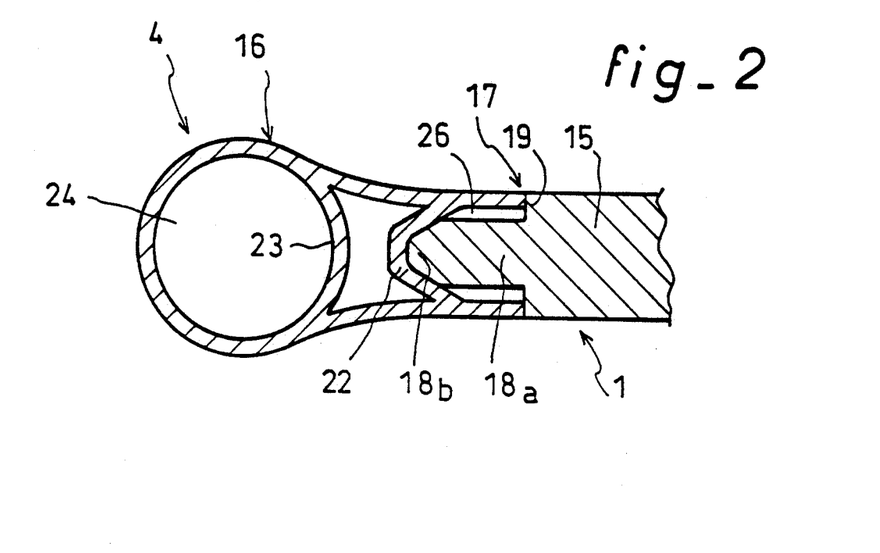
FIG. 2 is a partial transverse section taken, on a larger scale, along line II—II of FIG. 1.
Figure 3:
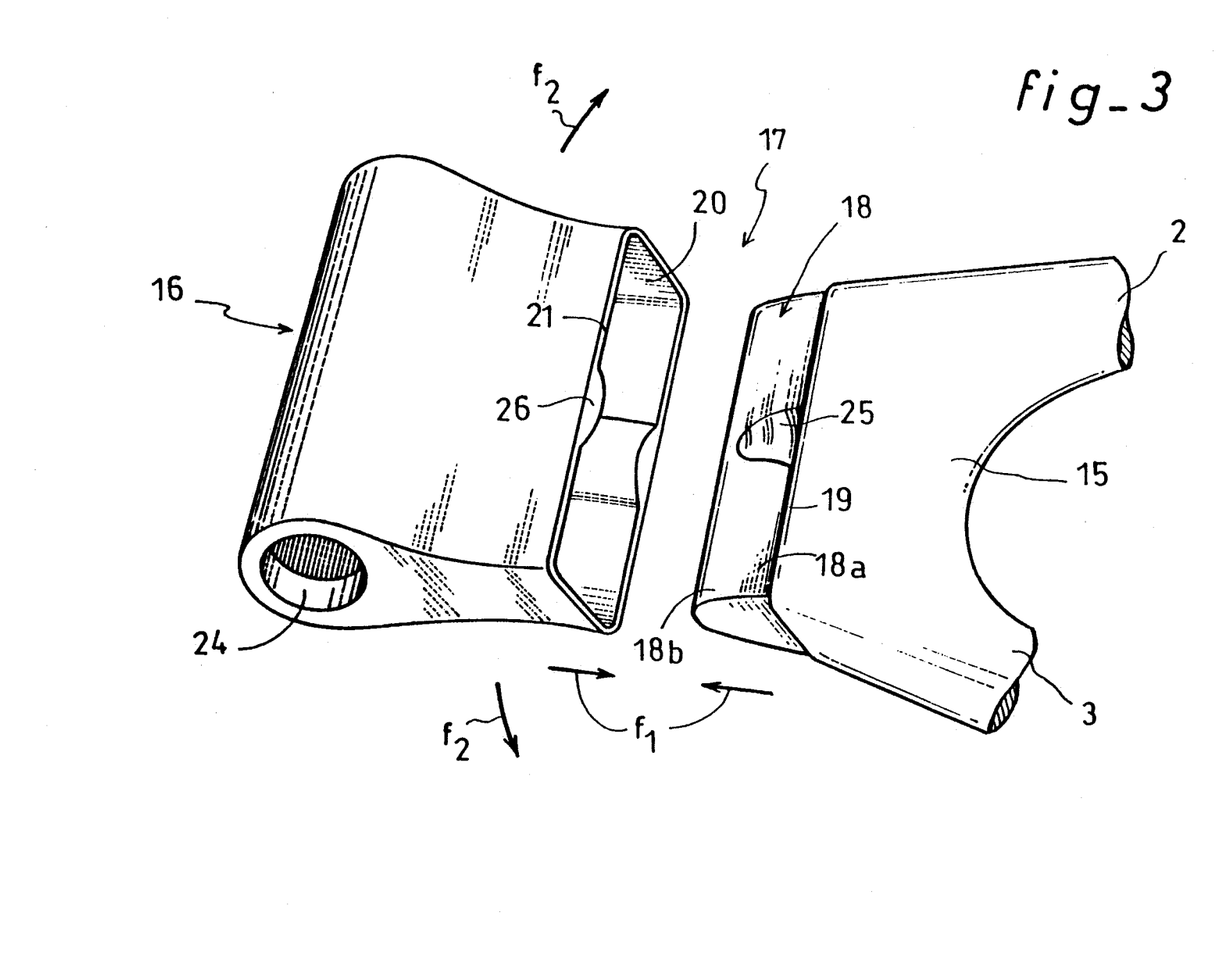
FIG. 3 is an exploded view showing, on a larger scale, a detail of construction corresponding to FIG. 2.

FIG. 2 shows that the base 20 is defined, inside the steering box 16, by a wall 22 adapted to cover the top front part of the half-core 18. The inner wall 22 constitutes a stiffening web, in the same way as an arcuate wall 23 defining, inside the steering box 16, the housing 4 intended for the assembly of a lining or jacket for assembly of the steering pivot of the fork 5.

Fit of the steering box 16 on the frontal part 15 is ensured by relative fit between the half-core 18 and the base 20, in the direction of arrows $f_1$ in FIG. 3, with the interposition, on the conjugate surfaces, of a film of an adhesive product such as a glue, adapted to the nature of the materials employed. Fit is effected until the edge 21 abuts against the shoulder 19, so as to obtain a firm and resistant bond in the three dimensions.

FIG. 3 shows that it is advantageous to provide, on the lateral faces of the core 18, transverse cavities 25 and, on the inner faces of the hollow base 20, blocking elements 26 of conjugate shapes. The nest fit produced is thus reinforced mechanically, in particular against the stresses imposed during use in one or the other of the directions of arrows $f_2$.

An examination of FIG. 1 will show that the proposition acording to the invention makes it possible to produce steering boxes 16 which present different heights. The choice of the appropriate height of the steering box 16 makes it possible to raise or lower the head tube mounted in the pivot of the fork and, consequently, to give to a frame of given gauge an appropriate height or size, such as one of those represented in FIG. 1 by references $H_1$ to $H_5$.

It must be mentioned that it is also possible to modify the orientation of the plane of edge 21 with respect to the axis of the housing 4 and to vary, as required, the angle of clearance $\gamma$ having to be given to the fork 5.

Figure 4:
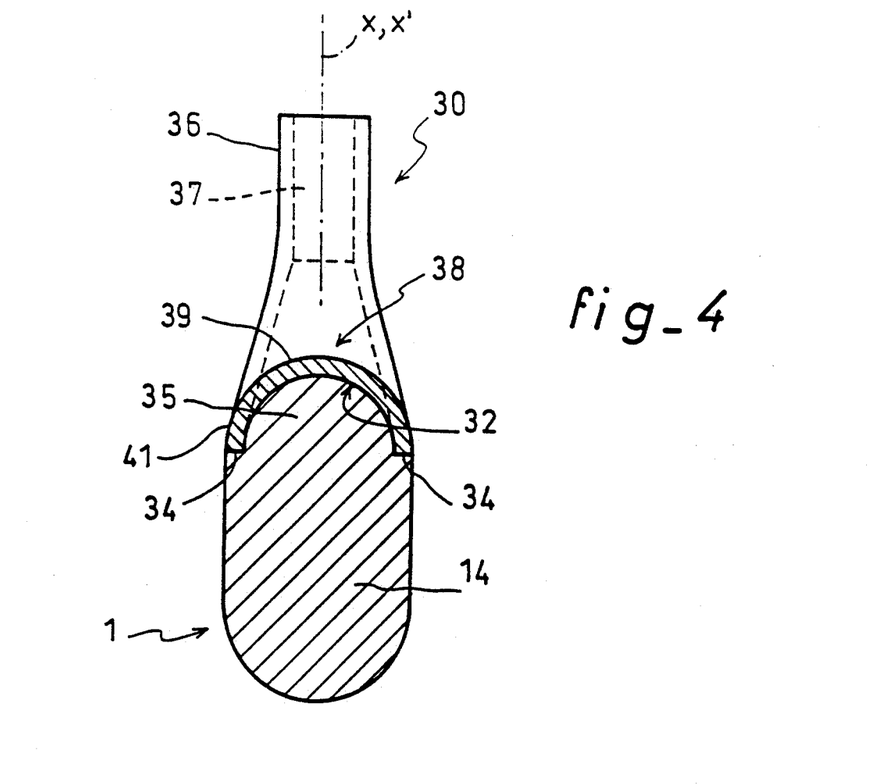
FIG. 4 is a transverse section taken, on a larger scale, along line IV—IV of FIG. 1.
Figure 5:
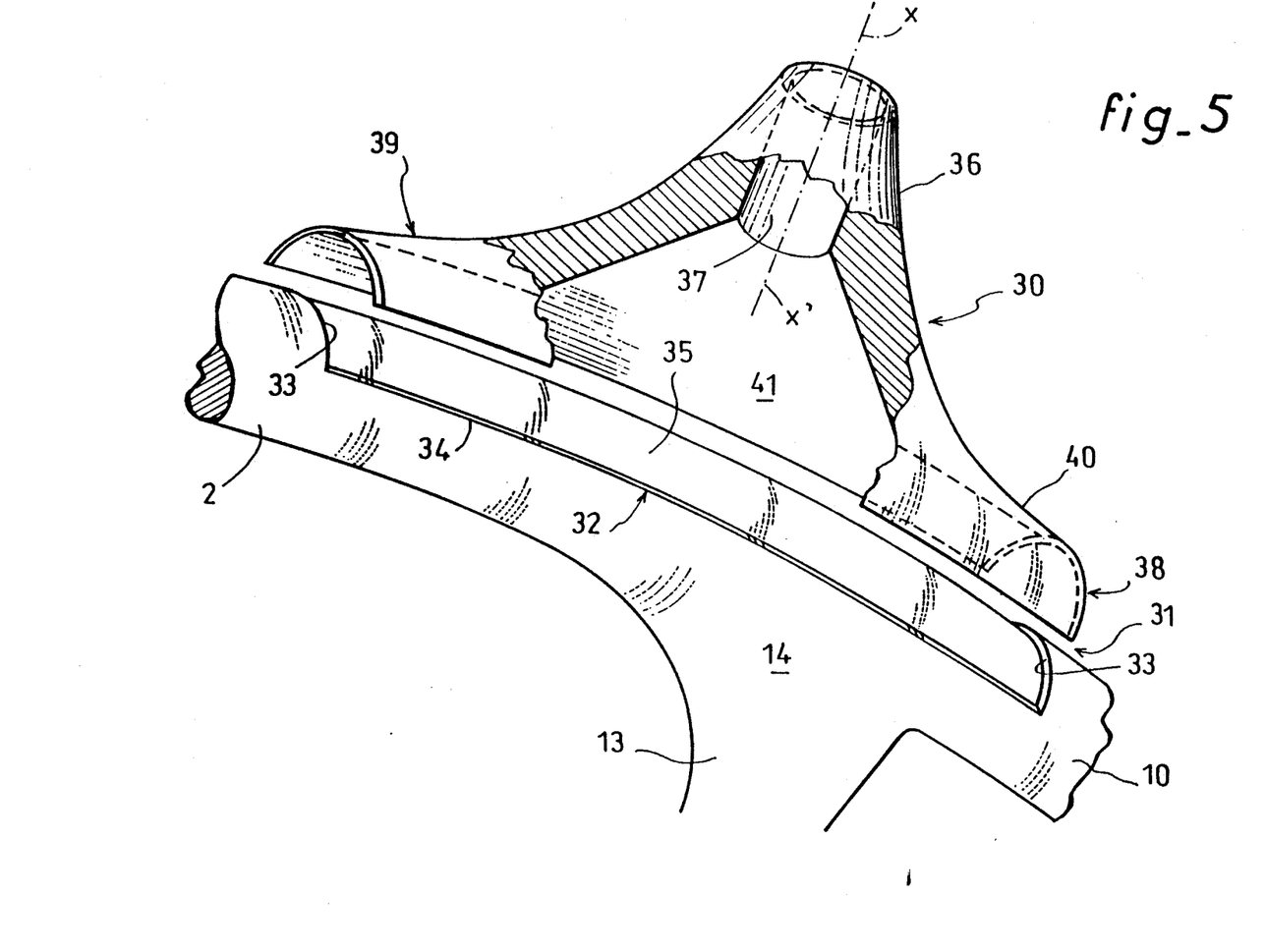
FIG. 5 is a partial perspective view, exploded and with parts torn away, of a detail of construction of FIG. 4.

According to another constructive arrangement of the invention, the continuous sectioned connecting part 14, included between the upper tube 2 and the stays 10, advantageously ensures the positioning of a suitable seat tube 30 by a fork fit 31 of which the constructive details are shown in FIGS. 4 and 5. The seat tube 30 is intended to ensure correct positioning of the seat post.

The fork fit 31 comprises, on the connecting part 14 and from its upper convex edge, a hollow cut-out 32 made in the thickness of part 14 over a substantially constant depth. Cut-out 32 comprises two transverse raised edges 33 joined by two longitudinal raised edges 34 which follow the general profile of part 14, being established substantially at mid-height. The hollow cut-out 32 reveals a half-core 35 for fit, extending continuously or not over the whole length of the cut-out and presenting, preferably but not exclusively, a semi-cylindrical transverse cross section.

The seat tube 30 comprises a shaft 36 defining, in its upper part, an opening housing 37 reserved for the assembly, by any appropriate means, of a seat post proper. The shaft 36 is extended downwardly by a hollow assembly base 38, open and elongated, comprising two respectively front and rear terminal parts 39 and 40. The terminal parts 39 and 40 are characterized by a thickness corresponding to the depth of the cut-out 32 and by a shape corresponding to that of the cut-out 32 and the half-core 35 which is given, by way of example according to FIG. 5, as concerning only part 14, without extension on stays 10. In this example, therefore, the terminal parts, of substantially semi-cylindrical tubular shape, appear open opposite shaft 36. The terminal parts 39 and 40 are connected together by fitting flanks 41 forming part of the base 38.

In an illustrated embodiment, the length of the base 38 corresponds to the length of the cut-out 32 and the section of the terminal parts 39 and 40 is chosen in relation with the height of cut-out from the upper convex edge of the connecting part 14.

The seat tube 30 is fitted by depositing on the conjugate surfaces of the fork fit 31, a film or coating, such as a glue, ensuring an interfacial bond between, on the one hand, the core 35 and the raised edges 33 and 34 and, on the other hand, the terminal parts 39, 40 and the flanks 41 for fit.

In this position, as illustrated in FIG. 4, the seat tube 30 is fitted astride the connecting part 14, being efficiently immobilized in the three directions. In this position, axis x—x' of the seat post preferably passes through the transverse axis of the crankset casing 9.

The seat tube 30, like the steering box 16, may be made with different heights of shaft 36. By choosing an appropriate seat tube 30, it therefore becomes possible to give a frame 1 of given gauge a suitable height or size, for example, chosen among those referenced $H_1$ to $H_5$ in FIG. 1.

By judiciously choosing the box 16 and tube 30, it is thus possible to give any size to a given frame. In such a case, box 16 and tube 30 should be selected to be coordinate in order to define one of the frame levels $H_1$ to $H_5$ for example. However, it is also possible to choose box 16 and 30 not to be coordinate, if it is desired to give the user an upright or a dropped or back-tipped position. All combinations are thus possible in order to be adapted to a range of sizes constituting standards or to a individualized frame geometry to correspond exactly to the size of the body parts in a determined posture of a particular cyclist.

Such easy adaptation to the morphological characteristics or to the requirements of posture of the user may be ensured by employing a frame of given gauge and suitably chosen box 16 and tube 30. Experience has proved that all the frame sizes likely to be required are covered by a range of two basic frames which may therefore be manufactured on an industrial scale at an advantageous cost price.

Figure 6:
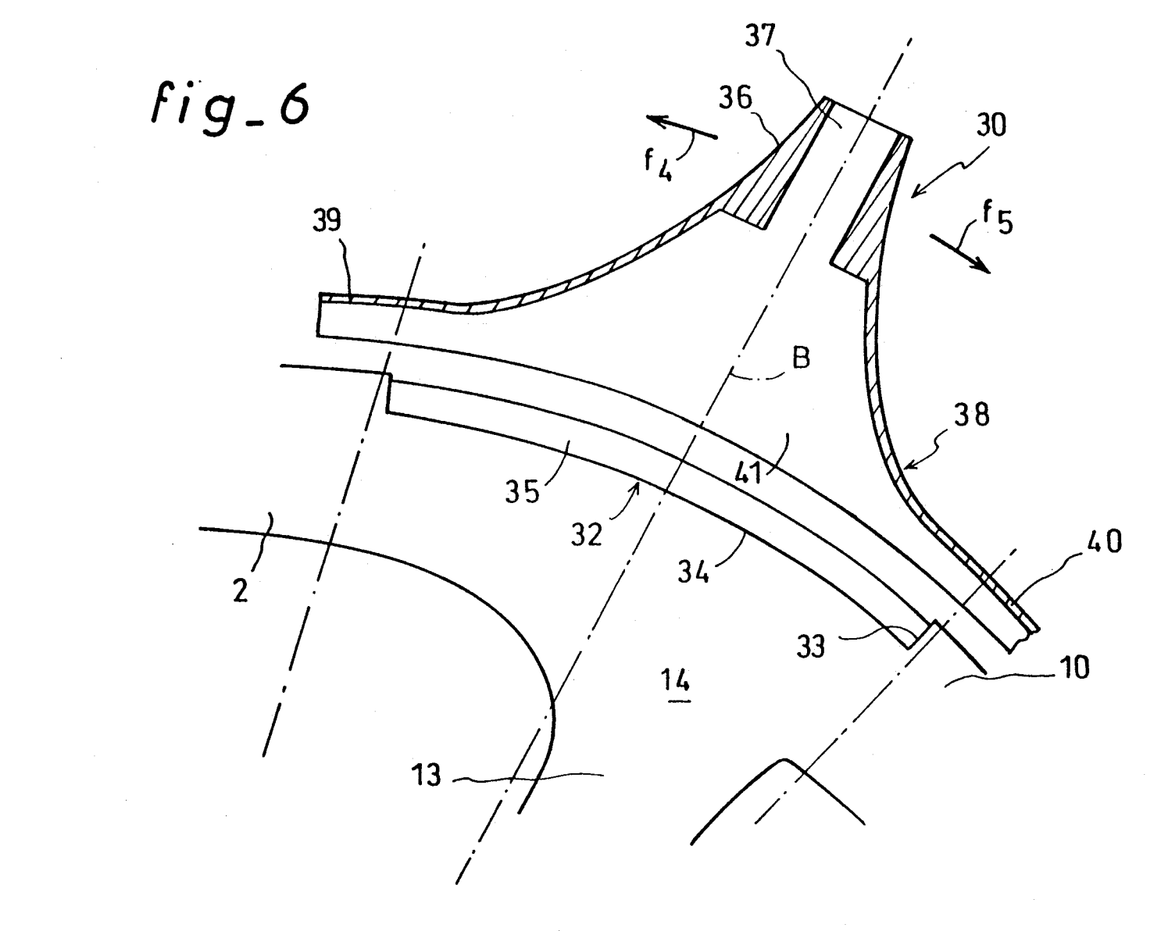
FIG. 6 is a section illustrating a variant embodiment of one of the elements constituting the frame.

FIG. 6 shows a variant embodiment in which it is provided to give to part 14 an upper edge defined by a circular radius of curvature, for example centred on centre C. It is also provided to give the same conjugate shape to the base 38 30 so that it is possible to displace the seat tube 30 in the direction of arrow $f_4$ or in the direction of arrow $f_5$, from a central neutral position such as the one defined by the bisectrix B of the cut-out 32.

According to a feature of the invention, the base 38 is also provided with terminal parts 39 and 40 defining an overall length greater than cut-out 32. The terminal parts 39 and 40 are divisible or adapted to be reduced in length, so that it becomes possible to adapt the length of the base 38 exactly to that of the cut-out 32, by additionally choosing to privilege the cut-out of one or the other of the terminal parts 39 and 40 to bring closer or move apart the shaft 30 with respect to the vertical axis A passing through the crankset casing 9.

In this way, it becomes possible, in practical and rapid manner, to modify the recoil of the seat tube with respect to the front fork pivot 5 and also, by acting for example on the handlebar tube, to give the user a position more advanced or recoiled with respect to axis A.

Figure 7:
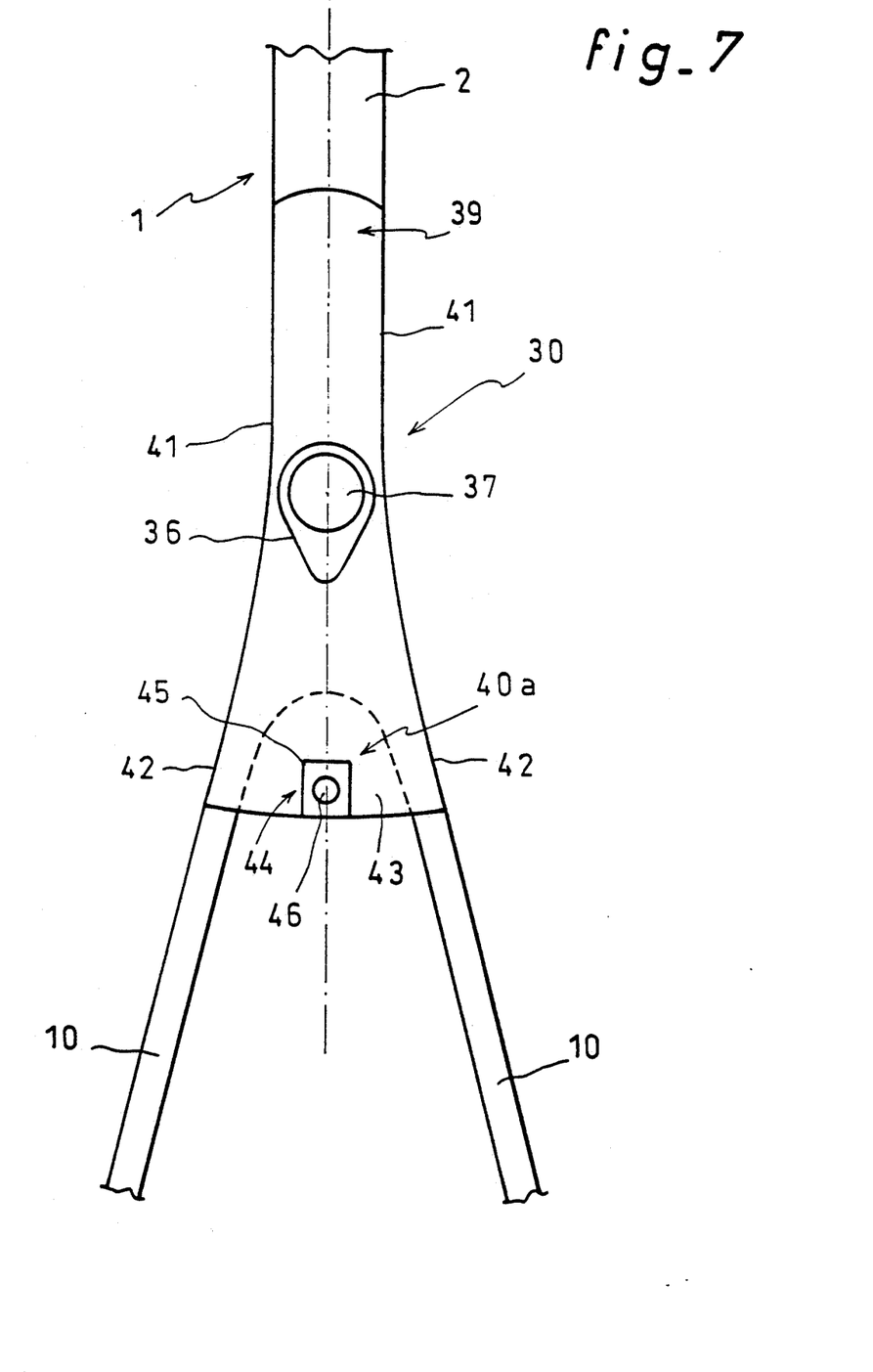
FIG. 7 is a plan view taken, on a larger scale, along line VII—VII of FIG. 1.

FIG. 7 shows a variant embodiment of the seat tube 30 especially adapted to correspond to a cut-out 32 extending partly over the stays 10. In such a case, the terminal part 40a is palm-shaped with two lateral edges, curved downwardly, inscribed in the profile of the flanks 41. In that case, the terminal part 40a advantageously comprises an area 43 provided with means 44 for assembling a rear wheel brake. Means 44 may consist of a boss 45 and a hole 46.

It will be readily appreciated that, if the different possibilities set forth hereinabove are obtained when the frame is constructed in accordance with the characteristics of the invention, by employing box 16 and tube 30 adapted as stated above, they are acquired more simply, more rapidly and at lower cost when the frame 1 and the box 16 and tube 30 are made of composite materials.

The invention finds a preferred, but non-limiting, application in the manufacture of made-to-measure cycle frames for racing.

The invention is not limited to the embodiments described and shown, as various modifications may be made without departing from the scope thereof.

What is claimed is:

1. A cycle frame comprising:
   an upper tube having front and rear end portions;
   an inclined lower tube having upper and lower portions;
   a frontal portion interconnecting the front end portion of said upper tube with the upper portion of said inclined lower tube, said frontal portion terminating in a forwardmost core portion, said core portion having an associated thickness that is less than the thickness of the remainder of said frontal portion;
   a front fork pivot housing attached to said frontal portion, said front fork pivot housing being formed by a steering box which is secured to said core portion;
   stays extending rearwardly and downwardly from the rear end portion of said upper tube, said stays and said upper tube defining a continuously formed, connecting part;
   a rear fork extending rearwardly from the lower portion of said inclined tube and joining said stays;
   a bearing assembly located at the juncture of said stays and rear fork, said bearing assembly being adapted to support an axle of a rear wheel;
   a crankset casing provided between the lower portion of said inclined tube and said rear fork; and
   a seat post housing formed by a seat tube, said seat tube having a forked base secured to said connecting part.

2. A cycle frame as claimed in claim 1, wherein said steering box encloses said core portion and is secured thereto by an adhesive material.

3. A cycle frame as claimed in claim 2, wherein said frontal portion includes a peripheral stop shoulder defined about said core portion and said steering box includes a hollow base portion having a peripheral edge, said hollow base portion receiving said core portion with said peripheral edge engaging said peripheral stop shoulder.

4. A cycle frame as claimed in claim 3, wherein said core portion includes two laterally opposed cavities and said hollow base portion includes internal, laterally opposing walls each being formed with a blocking element which is complementary in shape and extends into a respective one of said cavities.

5. A cycle frame as claimed in claim 1, wherein said core portion includes an end section that is generally trapezoidal-shaped in cross-section.

6. A cycle frame as claimed in claim 1, wherein said connecting part includes an upper section that is curvilinear.

7. A cycle frame as claimed in claim 1, wherein said connecting part includes an upper section having a cut-out portion of substantially constant depth, said cut-out portion being bordered by two transverse raised edges and two lateral raised edges, said forked base of said seat box being secured within said cut-out portion.

8. A cycle frame as claimed in claim 7, wherein said seat post housing includes at least one terminal part that is palm-shaped, said stays extending rearward from said terminal part.

9. A cycle frame as claimed in claim 8, wherein said at least one terminal part includes means for assembling a rear wheel brake thereto.

10. A cycle frame as claimed in claim 7, wherein said forked base comprises two terminal parts joined by spaced lateral flanks, said terminal parts and said flanks having associated thicknesses substantially equal to the depth of said cut-out portion.

11. A cycle frame as claimed in claim 10, wherein said seat post housing extends upwardly along an axis from said forked base, said two terminal parts extending different lengths fore and aft of said axis respectively.

12. A cycle frame as claimed in claim 1, wherein said upper tube and stays define a continuous, convexly curved frame element whose convexity faces upperward, said lower tube defines another convexly curved frame element whose convexity faces upward, and said rear forks define additional convexly curved frame elements whose convexity faces upward.

* * * * *